Figure 6:
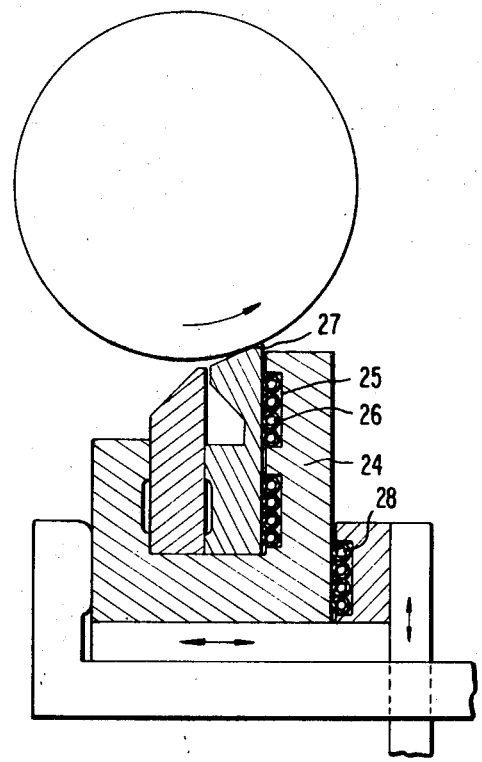

United States Patent

[11] 3,600,750

| [72] | Inventor | Joachim Stroszynski<br>Wiesbaden, Germany |
|---|---|---|
| [21] | Appl. No. | 693,998 |
| [22] | Filed | Dec. 27, 1967 |
| [45] | Patented | Aug. 24, 1971 |
| [73] | Assignee | Kalle Aktiengesellschaft<br>Wiesbaden-Biebrich, Germany |
| [32] | Priority | Dec. 29, 1966 |
| [33] | | Germany |
| [31] | | K 61046 |

[54] EXTRUSION DIE OR NOZZLE
10 Claims, 8 Drawing Figs.

[52] U.S. Cl. .................................................. 18/12 DS, 18/15 R
[51] Int. Cl. .................................................. B29f 3/04
[50] Field of Search .......................................... 18/12 DS, 12 DR, 14 V, 12 DH, 12 DM, 15 M, 15 F, 13 D, 12 R, 12 DV

[56] References Cited
UNITED STATES PATENTS

| 2,761,419 | 9/1956 | Mercier et al. ............... | 18/15 F X |
| 3,096,543 | 7/1963 | Konopacke et al. .......... | 18/15 F X |
| 3,334,792 | 8/1967 | Vries et al. .................... | 18/15 X |
| 3,377,655 | 4/1968 | Kucharski et al. ............ | 18/12 DS |
| 3,417,430 | 12/1968 | Smedt et al. .................. | 18/12 DS |
| 2,387,718 | 10/1945 | Coleman ...................... | 18/12 DS |
| 3,122,789 | 3/1964 | Coffee .......................... | 18/12 DS |
| 3,134,832 | 5/1964 | Smith ............................ | 18/14 V X |

FOREIGN PATENTS

| 626,815 | 10/1961 | Italy ............................. | 18/12 DS |

*Primary Examiner*—J. Spencer Overholser
*Assistant Examiner*—Michael O. Sutton
*Attorney*—James E. Bryan ABSTRACT: This disclosure relates to a slotted die comprising a pair of abutting cheek means having a discharge slot between them, external means for supporting the cheek means, chamber means in the external means, and means for exerting pressure in the chamber means whereby the cheek means are urged together.

Patented Aug. 24, 1971
3,600,750
2 Sheets-Sheet 1
FIG.1
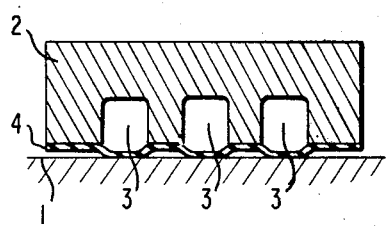
FIG.2
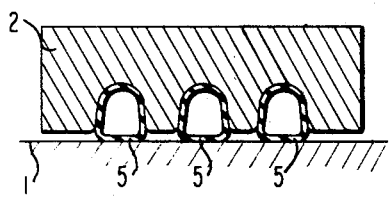
FIG.3
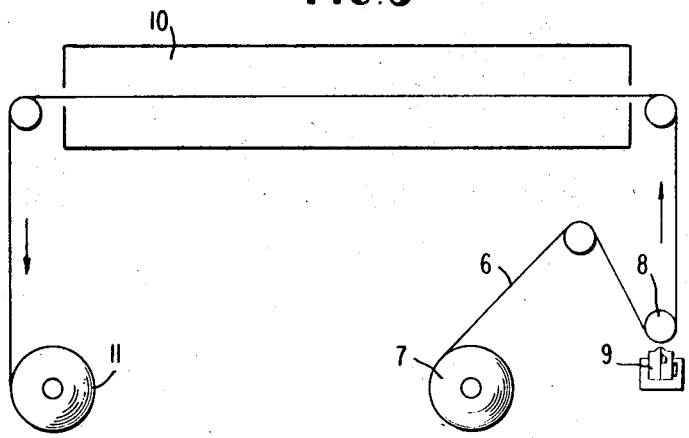
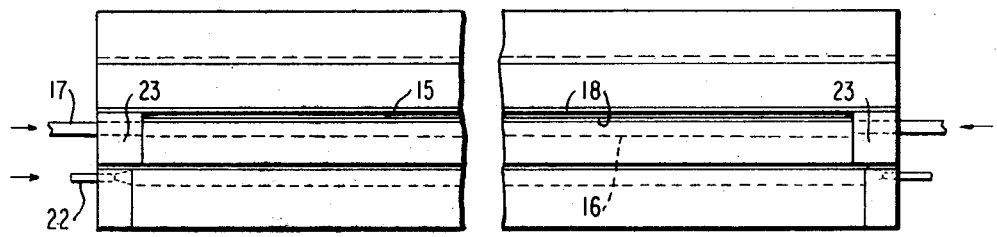
FIG.5
FIG.4
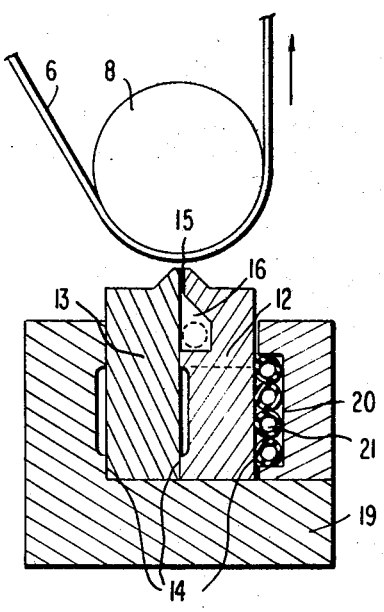
INVENTOR
JOACHIM STROSZYNSKI
BY James E. Bryan
ATTORNEY Patented Aug. 24, 1971 3,600,750

2 Sheets-Sheet 2

INVENTOR
JOACHIM STROSZYNSKI

BY *James E. Bryan*
ATTORNEY

EXTRUSION DIE OR NOZZLE

This invention relates to an extrusion die or nozzle. The primary use of this device is for coating flat material with a liquid coating medium. Appropriately designed, it can be used instead for casting self-supporting films, for extruding thermoplastic materials into films, or as a so-called compressed air knife or brush.

Flat materials such as paper, plastic films or metallic foils frequently are provided with thin coatings. Various methods of applying these are known using the so-called coating machines. The actual coating element in these machines can be constructed in accordance with various principles. Flat sheeting dies have proved reliable as coating elements particularly in the manufacture of photographic materials. Usually, these dies include two elongated plates or cheeks which are positioned a small distance apart in such a manner that a longitudinal slot is formed between them. The liquid coating medium passes through this slot onto the surface to be coated. As a rule, the rate of feed of the flat material and the amount of liquid that passes through the slotted die in a given unit of time are so related that, irrespective of the rate of feed of the flat material, a coating of uniform thickness is obtained on the surface.

Since the width of the gap is very small in relation to the length of the slotted die, which latter must correspond to the width of the material to be coated, high precision is called for in the manufacture of such flat sheeting dies. The width of the gap usually is within the range 100 to 300 $\mu$. Furthermore, variations in the width of the gap cause a disproportionate amount of coating medium to emerge from the gap during each unit of time, so that a high degree of uniformity in the width of the gap also must be continuously maintained during the use of flat sheeting dies. This requirement is difficult to meet in practice. Flat sheeting dies usually consist of two cheeks which are pressed together in such a manner as to produce a seal between their contacting surfaces and which usually have tapered lips between which the discharge gap is formed. In various known constructions, the cheeks are drawn tightly together by means of screws distributed at regular intervals over the breadth of the slotted die. These however set up continuous stresses of varying magnitude in the material, and these stresses in turn cause irregularity in the width of the gap. It is therefore necessary to regulate the width of the gap during production runs by slackening off or tightening the screws. This has resulted in a changeover to the practice of clamping the cheeks between two longitudinally disposed flat bars and drawing these together so that they exert an even pressure upon the cheeks. However, even this expedient does not provide the required uniformity in the width of the gap during operation.

A further disadvantage associated with the known flat sheeting dies is that they are difficult to clean and, after cleaning, time-consuming resetting of the width of the gap is always necessary.

The present invention provides a slotted die or nozzle in which the slot is formed between two cheeks which, when assembled, meet over plane parallel surfaces extending in the longitudinal direction of the slot, the cheeks in the assembled condition being confined between corresponding surfaces of an external member or members, under a fluid pressure exerted in one or more chambers in a confining surface of such an external member, which chamber or chambers is or are sealed to maintain the fluid pressure by resilient means arranged to make confining contact under the pressure with the adjacent cheek surface.

The chambers preferably are formed as longitudinal recesses or grooves milled into the external member. In their simplest form they are of rectangular cross section or of a slightly rounded rectangular cross section. The resilient means may be a flat rubber sheet or a resilient sheet of metal which is fitted on the surface containing the recesses. Instead, resilient hoses may be used.

The invention will be further illustrated by way of example in the accompanying drawings, in which:

FIG. 1 is a transverse section through an arrangement of chambers as referred to above, FIG. 2 is a similar view of another embodiment in which the chambers are of different section, FIG. 3 is a diagrammatic view in elevation of a coating machine including an extrusion die according to the invention, shown in section, FIG. 4 is a section including the die of FIG. 3 on an enlarged scale, FIG. 5 is a plan view of the die of FIG. 4, and FIGS. 6 to 8 show sections similar to FIG. 4 of other embodiments of the extrusion die.

Referring to the drawings, in FIG. 1, mounted parallel to the pressure surface 1 of one of two cheeks of an extrusion die, is a flat bar 2 in which are cut the longitudinal grooves 3. These grooves are tightly sealed by a sheet 4 of resilient material which is cemented to the webs remaining after the grooves have been cut. When the chambers are put under pressure, the resilient sheet, as shown in FIG. 1, is deflected outwardly and presses the cheek 1 in the direction of the arrow. The flat bars are sufficiently robust to resist the load without yielding, being firmly attached to the machine frame. The surface loads applied over the corresponding narrow zones and deriving from the chambers may be the same or different, depending upon whether the pressure in the various chambers is the same or different. Generally the pressure will be the same, but it can be varied with the object of providing a predetermined pressure pattern.

In the embodiment of FIG. 2, the grooves are of semicircular form at their tops as illustrated. In this case resilient hoses 5 are inserted in the chambers. These hoses have an outside diameter roughly equal to the depth of the grooves, so that if unstressed they would project further than shown and they are so fitted that when subjected to internal pressure they again press the cheeks 1 outwardly as shown. Here again the internal pressure in the various hoses can be the same or different. Furthermore, it is possible to fit more than one hose in a chamber.

It has proved particularly advantageous to connect the pressure-carrying bars rigidly together to form a U-shaped carrier in which the cheeks can be inserted. Then, one or more longitudinal grooves are cut in the internal surfaces of both shanks of the U-shaped carrier and the grooves are covered with resilient means or are provided with hoses which are held therein and act as pressure-exerting chambers.

FIGS. 3 to 8 illustrate dies of this preferred form.

In the coating machine of FIG. 3, a web of material 6, for instance paper, is unwound from a roll 7 and passes around a roller 8 mounted opposite to a coating die 9. The coated material then passes through a drying passage 10 and is wound onto the roll 11.

The use of a die of the invention is not, however, limited to the coating of continuous webs of material; it also can be employed for coating separate sheets in the so-called format coating machines.

Fig. 4 shows the die of FIG. 3, again with the roller 8 mounted above it and the web 6 passing around the roller. Two massive cheeks 12 and 13 having planar parallel faces 14 are mounted in a U-shaped carrier 19. The cheek 12 is reduced on its inner surface near the top, so that a gap 15 is formed.

The U-shaped carrier 19, constituted by flat bars as previously mentioned, is provided with a longitudinal groove 20 in which the hoses 21 are held together. They extend over the entire length corresponding to the discharge orifice and are so positioned that, when subjected to internal pressure, they press the smooth, self-sealing inner faces of the cheeks against one another. For low pressure and low temperatures, rubber and other resilient polymers may be used as the material for the hoses. In the case of higher pressure and higher temperature, metallic hoses are used. Their wall thickness is normally of the order of 3.0 to 0.4 mm., depending on the material and intended application. The hoses are assembled with slight prestressing so that they stretch only a little or not at all when they are placed under internal pressure. The hoses can be pressurized through a feed pipe 22. In the case of lower pressures, compressed air is used for this purpose. The pressure in the hoses depends upon the surface pressure required and this, in turn, upon the internal pressure in a transverse reservoir channel 16 for the material to be extruded and, to some extent, upon the elasticity of the hoses. For die or nozzle pressures above or around 3 atmospheres, a liquid generally is used. The pressure generally will not exceed 8 atmospheres. In the case where compressed air is used, normal check valves, as used in automobile tires, can be fitted in the air pipe. It is then satisfactory if the hoses are put under pressure prior to each use of the machine. To obtain a high surface pressure, pressure surfaces between the cheeks or between a cheek and the carrier are recessed as shown in FIG. 4 and also in FIGS. 6 to 8.

Although inflating with air is the simplest method of expanding the hoses, because of the smaller contraction in volume of water and oil, it is preferable in some instances to use these as pressure media for lower pressure ranges.

A further advantage in the use of liquids for transmitting the pressure is that these also can act as heat carriers at the same time. Thus, it often happens that a coating liquid must be handled at an elevated temperature. To prevent cooling in the die, the cheeks are maintained at the working temperature by passing a liquid, under pressure, through the pressure-applying hoses, the liquid being maintained at the required temperature with the aid of a thermostat. In this case, metal pipes or metallic coverings for the chambers are used almost exclusively because of the better heat transfer. To prevent unnecessary heating of the pressure-carrying flat bars, the U-shaped carrier in this instance, the inner walls of the pressure chambers facing the bars may be lined with a heat-insulating material.

When a liquid having a high coefficient of thermal expansion is used as the pressure-applying medium, it is possible in a closed system provided with heating means in a suitable position, to utilize the thermal expansion of the liquid for pressing the cheeks together.

A particular problem is the lateral sealing of the cheeks. The higher the internal pressure and the lower the viscosity of the coating medium in the chamber, the greater is the care required in effecting this seal. Whereas the smooth inner faces of the cheeks can be easily rendered self-sealing by appropriate machining, other steps must be taken in the case of the lateral seal. A known and frequently used method is, for instance, that of grinding the end faces of both cheeks so that they are in the same plane and then fitting a smooth plate on the resulting surface. Since, however, once they are taken apart, the cheeks cannot be fitted together again with the same accuracy, with a seal of this kind the end faces have to be reground after each cleaning of the die. This method is very expensive and another way of effecting the lateral seal has been devised, this being particularly easy to carry out in the case of the die of the present invention.

This latter method can be seen from FIG. 5. One of the two cheeks, as shown it is the one containing the channel 16, is made shorter than the other. Attached to its end faces are two abutments 23 which project beyond the reduced surface. These are ground in such a way that they are coplanar with the lower sealing face of this cheek. If this cheek is now fitted together with the other which has only a planar inner surface, a very reliable seal is obtained without other means. Accurate fitting is not necessary. Variants of this type of lateral seal are likewise possible.

By means of the pneumatic or hydraulic pressing together of the cheeks of the die by the method of the invention, these cheeks are urged together without any variation in stress occurring, irrespective of whether the loading is applied over one or more than one area. Apertures penetrating the entire material, such as are unavoidable when screws are used, are not necessary in this case. In order that the advantage resulting from the construction of the invention be fully utilized, it is necessary, when selecting the material for the cheeks, to take care that this, too, is stress-free and is machined in a stress-free manner. Good results have been obtained from the use of ferromagnetic chromium steels, which can be gripped by magnetic means during the machining. When machining the blanks, it is important to ensure that the longitudinal faces are flat and parallel. Dimensional accuracy, as formerly required in the manufacture of such dies, is no longer so necessary. The cheeks should be so dimensioned that they can be readily inserted between the rigid pressure bars, which are preferably arranged as a U-shaped frame as described. A tolerance of a few millimeters can be permitted if the resilient walls are arranged to expand correspondingly.

Because of the simple design of the die according to the invention, and particularly when the U-shaped carrier and pressure-transmitting hoses are used, assembly and fitting thereof in the coating machine are very simple. The cheeks are placed in the U-shaped carrier, the hoses inflated, the feed pipes 17 (FIG. 5) connected to a pump or screw conveyor (not shown) supplying the coating material, and the entire die is then positioned under the roller 8 (FIG. 3) around which the material to be coated passes. When the pump or screw conveyor supplying the coating liquid is actuated, a coating is applied to the web of material 6.

Since the width of the slot is fixed, the thickness of the coating can be varied in accordance with the amount of coating medium supplied. This can be achieved by raising or lowering the speed of the pump or screw conveyor supplying the liquid. It is often required to vary the conditions of application of the liquid to the web being coated. This is not possible in the case of the die as illustrated in FIG. 4. However, by the use of pneumatic or hydraulic pressure-applying means it is possible to alter the width of the gap in a uniform manner over the entire length of the die by providing a further longitudinal groove in one of the two flat pressure bars, i.e., as illustrated, in one of the arms of the U-shaped carrier, and by positioning this groove in such a way that the pressure applied to the resilient-walled chambers is exerted for the most part in the region of the discharge slot. For this purpose, it is advantageous to raise one of the two arms of the U-shaped carrier in order to obtain a larger bending moment. An example of this form of construction is illustrated in FIG. 6. In the die shown in FIG. 6, the right-hand arm 24 of the U-shaped carrier and the cheek adjacent thereto have a greater vertical dimension. The groove 25 and the hoses 26 clamped therein are so positioned that the force acts on the right-hand lip of the gap. The upper end face 27 of the cheek 24 is here so formed that the coating liquid emerging from the slot is applied to the material being coated by passing between it and this end face 27. This arrangement is particularly recommended if the coating liquids used have a viscosity in the range of 600–1000 c.p. In this case, when designing the die, it should be considered that very large shear forces occur in the space between the rubbing surface 27 and the material to be coated. With lower viscosities no rubbing action is necessary. The arrangement shown in FIG. 4 is, for example, preferable for dealing with coating media having a viscosity in the range of 8–20 c.p.

FIG. 6 also illustrates a further feature. The carrier with the cheeks within it is, in turn, supported in a resilient manner by means of hydraulic or pneumatic pressure applied by hoses 28 set in a further element of the device. Unevenness in the thickness of the material to be coated can in this case be compensated by yielding and recovery of the hoses 28.

Figure 7:
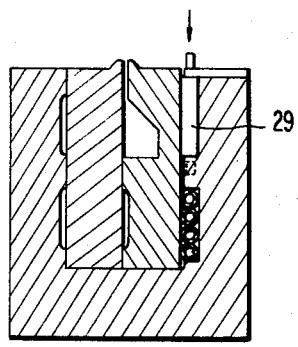

In cases in which for instance for rheological reasons or for reasons of corrosion, the cheeks must be made from materials which can not be maintained free from variations in stress and which therefor make it necessary to anticipate the possibility of the cheeks becoming distorted during use, an arrangement has proved advantageous in which several parallel chambers are cut, not longitudinally, but transversely and are distributed at regular intervals over the entire length of the die. Here again, as shown in FIG. 7, grooves 29, with hoses clamped therein, are preferably used. In this arrangement, the pressure in each hose can be regulated independently of the pressure obtaining in the other hoses. It is thus possible to correct changes in the width of the slot occurring when the die is in use by increasing or lowering the pressure in an appropriate manner in those hoses adjacent the affected area. As compared with existing methods, this method has the advantage that the pressure in the hoses and the width of the slot can be very accurately regulated over a continuous range.

Figure 8:
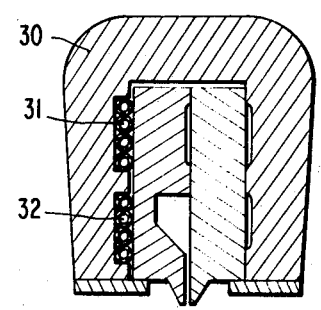

The form of construction of the die according to the invention as shown in FIG. 8 is intended for gravity flow of the material extruded from the die. Provided in one arm of a U-shaped carrier 30, having arms of the same length, are two grooves containing hoses 31 and 32 which respectively press the cheeks together and regulate the width of the gap.

A still further advantage of the device according to the invention is that when liquids of relatively low viscosity are being handled, variations in the thickness of the material to be coated, e.g. cemented joints in continuous paper webs, can be accommodated without tearing the paper, due to the resilient means for application of the pressure for urging the cheeks against the web. This renders the entire coating operation considerably less prone to breakdown and thus greatly reduces waste and down times. In this case it is of course preferable to apply pressure in a resilient manner to both cheeks, since otherwise the cheeks might be separated and coating material allowed to escape. It is still more advantageous to press the U-shaped carrier with the cheeks within it against a fixed seating with the help of pneumatic or hydraulic pressure chambers as shown in FIG. 6.

It is also possible, in one device, to press together, hydraulically or pneumatically, more than two cheeks between each pair of which a discharge gap is provided. This can be of interest for instance if several coatings must be applied one on top of the other and it is not possible to accommodate several separate coating elements in the space available.

As previously stated, the die according to the invention is used principally for coating flat material with a liquid coating medium. Here, due to the relatively low viscosity of the coating medium, the pressure obtaining between the cheeks and in front of the discharge point also is always relatively low. In principle, the same conditions also obtain in the manufacture of cast foil. However, it is also basically possible to operate with higher pressures in the supply channel between the cheeks. As previously stated, it is then necessary to provide metallic hoses or metallic coverings over the pressure chambers. Higher pressures occur particularly in the extrusion of thermoplastic polymers. However, if the die according to the invention is to be used in extruders, it is always necessary to check carefully whether the pressure and temperature conditions permit of hydraulic or pneumatic pressure being applied to the cheeks.

Furthermore, a die or nozzle according to the invention can be used as a so-called compressed air knife or brush. On account of the considerable constancy in the width of the gap, very good results also are obtained in this case. In this instance, the die does not need to be so massively designed as in the above described cases.

It will be obvious to those skilled in the art that many modifications may be made within the scope of the present invention without departing from the spirit thereof, and the invention includes all such modifications.

I claim:
1. A slotted die comprising a pair of abutting cheek means having a discharge slot between them, external means parallel to said discharge slot for supporting both of the cheek means, chamber means in the external means, and means for exerting pressure in the chamber means whereby the cheek means are urged together.

2. A slotted die according to claim 1 in which pressure is exerted on resilient means covering the chamber means.

3. A slotted die according to claim 1 in which pressure is exerted in resilient means positioned in the chamber means.

4. A slotted die according to claim 1 in which the external means is a U-shaped carrier.

5. A slotted die according to claim 1 in which the chamber means is at least one groove extending parallel to and being coextensive with the discharge slot.

6. A slotted die according to claim 1 including additional chamber means and means for exerting pressure therein whereby the width of the discharge slot can be narrowed.

7. A slotted die according to claim 6 including a plurality of said additional chamber means spaced longitudinally of the discharge slot whereby differential pressure can be exerted along the length of the slot.

8. A slotted die according to claim 1 in which a cheek means to which pressure is applied is angularly extended forward of and away from the discharge slot, and the external means is extended alongside this cheek.

9. A slotted die according to claim 1 in which a cheek means to which pressure is applied has a reservoir therein for material to be extruded.

10. A slotted die according to claim 9 including means for supplying material to be extruded to the reservoir.